(12) United States Patent
Mitsuda et al.

(10) Patent No.: US 8,173,289 B2
(45) Date of Patent: May 8, 2012

(54) ELECTRICAL ENERGY STORAGE CELL AND ELECTRICAL ENERGY STORAGE MODULE INCLUDING THE SAME

(75) Inventors: Kenro Mitsuda, Tokyo (JP); Daigo Takemura, Tokyo (JP); Osamu Hiroi, Tokyo (JP); Shigeru Aihara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 809 days.

(21) Appl. No.: 12/269,409

(22) Filed: Nov. 12, 2008

(65) Prior Publication Data
US 2009/0136832 A1 May 28, 2009

(30) Foreign Application Priority Data
Nov. 19, 2007 (JP) ................................ 2007-299143

(51) Int. Cl.
*H01M 2/20* (2006.01)
*H01M 2/30* (2006.01)
*H01M 4/70* (2006.01)
*H01M 10/04* (2006.01)
*H01M 10/0587* (2010.01)
*H01G 9/00* (2006.01)
*H01G 9/02* (2006.01)
*H01G 9/058* (2006.01)
*H01G 9/145* (2006.01)

(52) U.S. Cl. .......... 429/94; 429/162; 429/164; 361/502; 361/512

(58) Field of Classification Search ............ 429/94, 429/162, 164; 361/502, 504, 508, 512, 523, 361/528
See application file for complete search history.

(56) References Cited

U.S. PATENT DOCUMENTS

| 6,040,086 A | 3/2000 | Yoshida et al. |
| 2006/0238957 A1* | 10/2006 | Mitsuda et al. ............... 361/502 |
| 2007/0207379 A1 | 9/2007 | Hatta et al. |

FOREIGN PATENT DOCUMENTS

| JP | 6-140077 | 5/1994 |
| JP | 10-270048 | 10/1998 |
| JP | 10-284047 | 10/1998 |
| JP | 2000-4051 | 2/2000 |
| JP | 2000-106167 | 4/2000 |
| JP | 2002-75434 | 3/2002 |
| JP | 2006-286919 | 10/2006 |
| JP | 2007-26786 | 2/2007 |
| JP | 2007-265989 | 10/2007 |
| JP | 2008-226625 | 9/2008 |

* cited by examiner

*Primary Examiner* — Gregg Cantelmo
(74) *Attorney, Agent, or Firm* — Oblon, Spivak, McClelland, Maier & Neustadt, L.L.P.

(57) ABSTRACT

The storage cell includes a flat roll electrode that includes a strip of positive electrode having a positive electrode current collector foil and a positive electrode layer formed thereon, a strip of negative electrode having an electrode current collector foil and a negative electrode layer formed, and a strip of electrically insulated separator, the strip of positive electrode and the strip of negative electrode being wound into a flat roll configuration with the strip of electrically insulated separator sandwiched therebetween; a sealed casing that hermetically seals the flat roll electrode impregnated with an electrolyte; a positive terminal and a negative terminal each electrically insulated from the sealed casing, connected to the positive current collector foil and the negative current collector foil, respectively.

4 Claims, 11 Drawing Sheets

ELECTRICAL ENERGY STORAGE CELL AND ELECTRICAL ENERGY STORAGE MODULE INCLUDING THE SAME

FIELD OF THE INVENTION

The present invention relates to electrical energy storage cells wound into a flat roll configuration, such as electric double-layer capacitors, lithium-ion battery cells, or lithium-ion capacitors, and more particularly to electrical energy storage modules configured by interconnecting in series a plurality of such cells.

BACKGROUND OF THE INVENTION

Electrical energy storage cells of a flat roll configuration, contained in a casing include electric double-layer capacitors, lithium-ion battery cells, lithium-ion capacitors, and the like.

The electric double-layer capacitor is one such that polarization electrodes—cathode, i.e., positive electrode and anode, i.e., negative electrode—are placed that face to each other by way of a separator, and double-layer capacitance to be formed on surfaces of the polarization electrodes in an electrolytic solution is used.

The lithium-ion battery cell uses oxide compound such as of cobalt, nickel, manganese as a cathode (positive electrode) material, and carbon as an anode (negative electrode) material. The feature thereof is that the lithium can stably be charged and stored in the carbon anode.

In addition, a lithium-ion capacitor has been developed as a new electric double-layer capacitor. The lithium-ion capacitor is one such that lithium ions are doped into the anode of the electric double-layer capacitor, having a characteristic such that the lower limit voltage cannot be decreased to zero volts although an upper limit voltage higher than the voltage of the electric double-layer capacitor is gained.

Because of being contained in a sealed casing such as an aluminum-laminated casing or a metallic casing, such electrical energy storage cells can be configured to be low-cost and compact. However, since each output voltage thereof, which is in the order of 3 to 4 V, is lower when compared with an output voltage of 400 V of an aluminum electrolytic capacitor, typically, an electrical energy storage module is used that is constituted by interconnecting in series a plurality of the storage cells to thereby raise the output voltage.

Electrodes of a flat roll configuration for use in the electrical energy storage cell (hereinafter also called flat roll electrical energy storage cell) are formed in such a manner that the cathode layers and anode layers are applied onto strips of cathode current collector foil and anode current collector foil each having a thickness in the order of 10 to 30 micro-meters, and then such layers and foils are wound into a flat roll configuration, via a strip of porous separator made of cellulose or olefinic resin fiber, by several meters through several tens of meters, with a core of the flat roll configuration being centered. In comparison with a lamination type electrical energy storage cell having several tens of strip electrode laminated, the thus configured flat roll electrical energy storage cell has an advantage in low costs and mass production because of being rolled in a short time. Here, in many cases, roll cores are used only at the time of forming a flat roll configuration, and the cores are drawn out from the cell at the time of its completion. When the cores are left as they are, there is used a hollow tubular member(s) made of metal such as aluminum or of resin, or the like.

It is expected from a viewpoint of energy saving that such flat roll electric double-layer capacitors and lithium-ion capacitors will be applied to storage of regeneration energy generated by a motor. When used for brake regeneration in servo motors, elevator traction machines, or electric railroad cars, and for regeneration of electric motors of hybrid vehicles or the like, such capacitors are requested to achieve the performance of repetitive charging and discharging for a large current capacity that is more than 100 A. When the large current flows, power loss is generated in proportion to internal resistance and the square of the current, thereby reducing efficiency in the charging and discharging. Moreover, because of the power loss automatically resulting in heat generation, unless the current collector foil, which is a thermal conductor, rapidly carries out heat dissipation, then the temperature inside the electrical energy storage cell increases, which leads to sharp reduction in performance, thus causing reduction in life span. In particular, during charging, since the electrode swells and allows electrolyte to be taken in, it is likely to cause a deficiency of the electrolyte, which has been a factor that accelerates degradation. For that reason, to achieve the rapid charging and discharging performance in the flat roll electrical power storage cell, it has been necessary that the current collector resistance be significantly reduced to avoid heat build-up in the cell, as well as significantly reducing heat dissipation from the current collector foil. Note that the current collector resistance refers to an electric resistance from current collector foils of the cathode and anode until reaching respective current terminals.

In general, conventional flat roll electrical energy storage cells are constructed in which metallic tubs are ultrasonically bonded at a several places of the current collector foil, and are connected to current terminals for drawing out of the casing. Further, they are configured so that the electrolyte permeates, along the axial, into the separator by making the length of the separator in the axial direction longer than that of the current collector foil. For instance, the configuration of a typical flat roll lithium-ion battery cell is disclosed in which the separator stretches out to the outside in the axial direction, and tubs attached to the electrodes serve as the current terminal (e.g., Japanese Unexamined Patent Publication 2007-265989 (page 7, FIG. 3)).

Another configuration in a different flat roll electrical energy storage cell is disclosed in which the cathodes (positive electrodes) and anodes (negative electrodes) are each provided with an edge portion where no electrode layers oppositely extending away from the separator along the roll core axis are applied, and each cathode and anode terminals are bonded to the edge portion (e.g., Japanese Unexamined Patent Publication 2000-40501 (page 2, FIG. 1)).

Because in the construction in which metallic tubs are ultrasonically bonded at a several places of the current collector foil and are connected to current terminals for drawing out of the casing, only limited areas of the metallic tubs are bonded to the current collector foil, a problem has been that the heat generated from the current collector foil cannot efficiently be dissipated, as well as a problem of the current collector resistance that cannot be reduced. Another problem has been that the heat generated from the current collector foil cannot efficiently be dissipated because the thermal conductivity of the separator is lower than that of the current collector foil in the construction in which the separator stretches out to the outside in the axial direction. Furthermore, in the configuration in which edge portions are provided where no electrode layers oppositely projecting from the separator along the roll core axis are applied and in which the edge portions are connected to the edge portion, still another problem has been that although heat dissipation and interconnection resistance are reduced, the electrolyte becomes difficult to migrate, resulting in a deficiency of the electrolyte in some part of the internal separator, which hastens degradation of the separator.

SUMMARY OF THE INVENTION

The present invention is directed to overcome the above-described problems. An object thereof is to provide a flat roll electrical energy storage cell that has a configuration that facilitates heat dissipation in the cells and reduces current collector resistance, and further allows the electrolyte in each cell to easily migrate, whereby the partial deficiency of electrolyte in a separator is hard to occur.

Another object thereof is to provide an electrical energy storage module having heat dissipation characteristic improved in the cells, as well as reducing interconnection resistance between the cells, in an electrical energy storage module configured by connecting in series the flat roll electrical energy storage cells.

An electrical energy storage cell according to the present invention comprises a flat roll electrode that includes a strip of positive electrode having a positive electrode current collector foil and a positive electrode layer formed thereon, a strip of negative electrode having an electrode current collector foil and a negative electrode layer formed thereon, and a strip of electrically insulated separator, the strip of positive electrode and the strip of negative electrode being wound into a flat roll configuration with the strip of electrically insulated separator sandwiched therebetween; a sealed casing that hermetically seals the flat roll electrode impregnated with an electrolyte; and a positive terminal and a negative terminal each electrically insulated from the sealed casing, connected to the positive current collector foil and the negative current collector foil, respectively, wherein the positive current collector foil and the negative current collector foil oppositely extend away from the separator along a roll core axis, and each of the foils include edge portions having no positive layer or negative layer formed therewith, each of the edge portions is configured to include a cutaway (recessed) portion where part of the edge portions is not existing so that the separator is exposed at the cutaway (recessed) portion, and non-cutaway (non-recessed) portions constituting portions other than the cutaway (recessed) portion, each of the cathode current collector foil and the anode current collector foil is electrically coupled together in a lamination direction at the non-cutaway (non-recessed) portions and electrically connected to the positive terminal and the negative terminal, respectively, and an electrolyte reservoir that makes a contact with the exposed separator is provided at each of the cutaway (recessed) portions.

Furthermore, in the electrical energy storage module according to the present invention, a plurality of electrical energy storage cells according to the present invention are disposed so that each of the cathode terminals of a storage cell is closely located at each of the anode terminals of an adjacent storage cell, wherein each cathode terminal is connected to each corresponding anode terminal using an electrically conductive heat dissipation plate.

Since each of the cathode current collector foil and the anode current collector foil is electrically coupled together in a lamination direction at the non-cutaway (non-recessed) portions, an electrical energy storage cell according to the present invention can dissipate efficiently internally generated heat from the current collector foil via electrode terminal, as well as lowering a current collector resistance. Furthermore, since an electrolyte reservoir that makes a contact with the exposed separator is provided at each of the cutaway portions, as well as facilitating the electrolyte to migrate to the separator, the storage cell can compensate for excess or deficiency of an electrolyte in the separator using the electrolyte reservoir, to maintain the separator filled with the electrolyte at all times.

Furthermore, the electrical energy storage module according to the present invention can improve a heat dissipation characteristic of the cells, as well as reducing interconnection resistance between the cells. These and other features, advantages and objects of the present invention will be further understood and appreciated by those skilled in the art by reference to the following drawings.

DETAILED DESCRIPTION OF THE PREFERRED EMBODIMENTS

Embodiment 1

Figure 1:
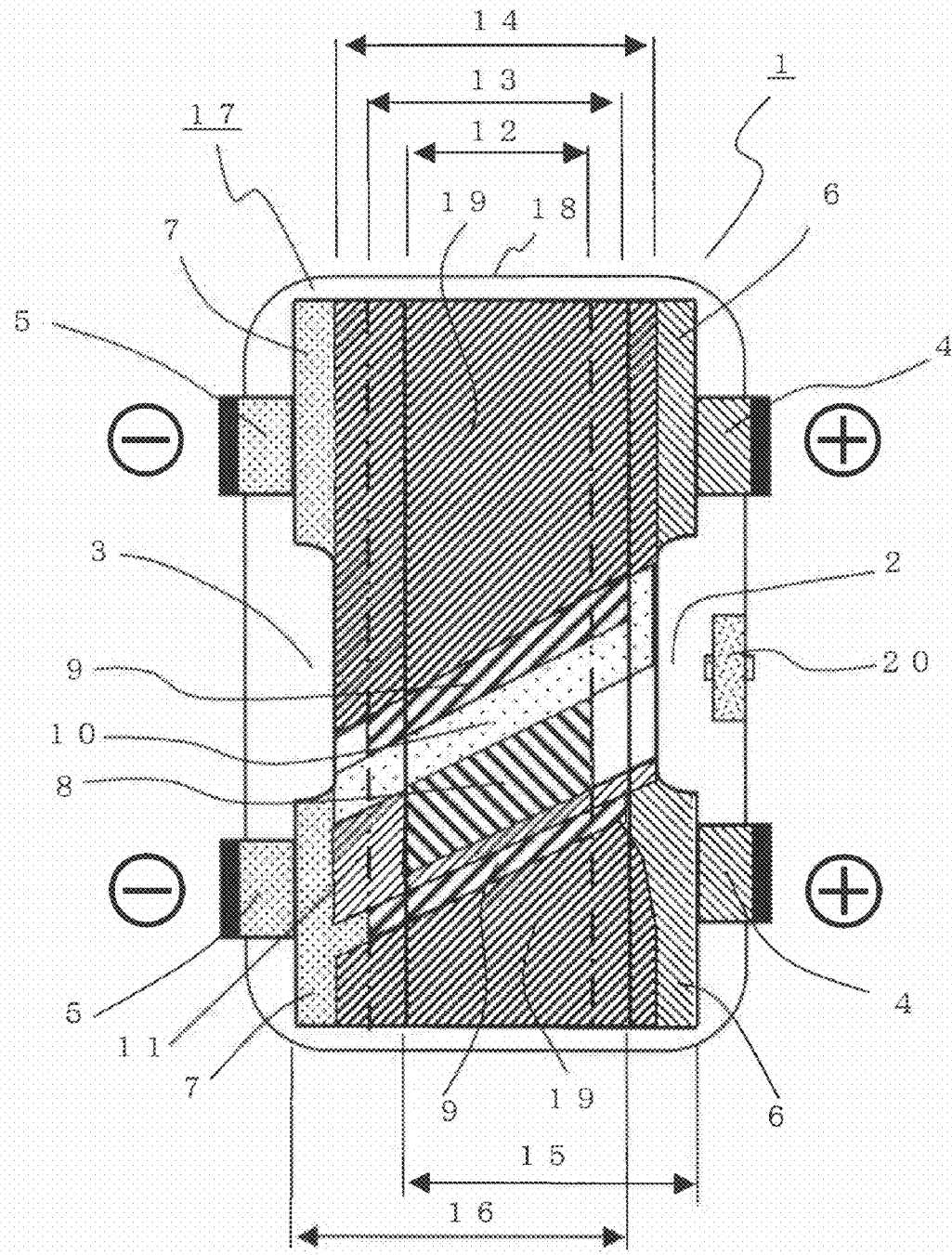
FIG. 1 is a partially cutaway schematic plan view of an electrical energy storage cell according to Embodiment 1 of the present invention.

FIG. 1 is a partially cutaway schematic plan view of an electrical energy storage cell according to Embodiment 1 for implementing the present invention. The electrical energy storage cell according to Embodiment 1 will be described in the case of an electric double-layer capacitor. The invention is not limited to this one, but can apply in the same way to a lithium-ion battery cell, a lithium-ion capacitor, or the like.

An electrical energy storage cell 1 in the present embodiment comprises two cathode (positive electrode) terminals 4 and two anode (negative electrode) terminals 5, whereby heat build-up in the cell is reduced and current collection thereof is enhanced. A cathode (positive electrode) current collector foil cutaway portion (also called cathode foil cutaway portion, or cutaway portion, or recessed portion), designated at 2, and an anode (negative electrode) current collector foil cutaway portion (also called anode foil cutaway portion, or cutaway portion, or recessed portion), designated at 3, are formed at places where separators are exposed as a result of cutting off using a cutting press machine a part of the edge portions 6 of the cathode current collector foil, and a part of the edge portions 7 of the anode current collector foil, respectively. The edge portion 6 of the cathode foil and the edge portion 7 of the anode foil are each supersonically bonded to the cell 1 in the direction of lamination, and further the cathode terminals 4 and anode terminals 5 are connected thereto by supersonic bonding.

Referring to FIG. 1, although a cathode layer 8 applied to the cathode current collector foil and an anode catalyst layer 9 applied to the back of the anode current collector foil, are indicated as both placed on a common surface for better understanding, such layers are actually individually placed as facing a separator 10. An inter-current-collector-foil electrolyte reservoir (also called inter-foil electrolyte reservoir), designated by reference numeral 11, is sandwiched between surfaces of the cathode current collector foil (also called cathode foil) and the anode current collector foil (also called anode foil), where the cathode layer 8 and anode layer 9 do not exist.

A double-arrow 12 shows the width of coating portion of the cathode layer 8; a double-arrow 13, the width of coating portion of the anode layer 9; a double-arrow 14, the width of the separator 10 and the inter-foil electrolyte reservoir 11; a double-arrow 15, the width of cathode current collector foil; and a double-arrow 16, the width of the anode current collector foil. A flat roll electrode, which is configured with such constituent elements, is contained in a sealed casing 18. In the present embodiment, a peripheral roll electrolyte reservoir 19 and a gas discharge valve 20 are also provided to the cell 1. Such components, although not necessarily needed, provide an advantageous effect as will be described later.

An aluminum foil having a thickness of 20 to 30 micro-meters is used as a cathode (positive) current collector foil, and as the anode (negative) current collector foil is used an aluminum foil having a thickness in the order of 20 μm, or a copper foil having a thickness of 10 to 20 micro-meters. The cathode (positive) terminal 4 uses an aluminum or stainless steel having a thickness in the order of 1 mm; the anode (negative) terminal 5 uses an aluminum or nickel-plated copper having a thickness in the order of 1 mm. Such thicknesses of metallic foils and current terminal are selected according to the magnitude of current delivered therefrom; the larger the current, the thicker the material is used.

The separator 10, the inter-foil electrolyte reservoir 11 and the peripheral roll electrolyte reservoir 19 use nonwoven fabric material including cellulosic fiber—such as natural pulp, natural cellulose, solvent fiber spinning cellulose, or bacteria cellulose—fiber glass, and non-fibrillated organic fiber. Other than such materials, they also use fibrillated form or porous film, such as of an aromatic polyamide, a wholly aromatic polyamide, an aromatic polyether, a wholly aromatic polyether, a wholly aromatic polyether polyamide, a wholly aromatic polyether, a wholly aromatic azo-compound, polyphenylenesulfide (PPS), poly-p-phenilenebenzobis-thiazole (PBZT), poly-p-phenilenebenzobisoxazole (PBO), polybenzo-imidazole (PBI), polyetheretherketone (PEEK), polyamideimide (PAI), or polyimidepolytetrafluorethylene (PTFE). The thickness applied for these materials is in the order of 15 to 50 micro-meters, porosity (volume porosity) is in the order of 60 to 80 percent, and the average pore diameter ranges from several micro-meters to several ten micro-meters. There are various average pore diameters to be applied, and the average diameters in the same material can easily be varied depending on mass per unit area. The average pore diameter can easily be measured with a commercially available porosimeter using mercury intrusion technique, or analyzer using gaseous adsorption and the like.

Materials for the cathode (positive) and anode (negative) layers, which differ according to the electric double-layer capacitor, lithium-ion battery cell, or lithium-ion capacitor, can employ typically used materials as they are. The electric double-layer capacitor can use a material that is made by adding carbon black as a conductive material to activated carbon particle and further mixing a thickener and a binder with the mixed substance, to make a paste that is then spread for dehydration. The thickness, which may differ depending on its applications, is in the order of 10 to 100 micro-meters.

Electrolyte to be impregnated with the separator and the electrolyte reservoir, which differ depending on the electric double-layer capacitor, lithium-ion battery cell or lithium-ion capacitor, can employ typically used materials as they are. The electric double-layer capacitor uses a salt compound that is produced by the combination of, for instance, the cationic radical of quaternary ammonium, 1,3-dialkilimidazorium, or 1, 2, 3-trialkylimidazorium, and the anion radical of $BF_4$-, $PF_6$-, $ClO_4$-, or $CF_3SO_3$-. The capacitor also uses another salt compound that is produced by a cationic radical of 1-ethyl-3-methylimidazorium (EMI), or 1, 2-dimethyl-3-propylimidazorium (DMPI), and the anion radical of $AlCl_4$-, $BF_4$- or the like. The catalyst uses an electrolyte solvent to be selected from the group consisting of propylene carbonate, ethylene carbonate, dimethyl carbonate, sulfolane, diethyl carbonate, dimethoxy-methane, diethoxyethane, γ-butyllactone, acetonitrile, propyonitrile, and mixture of two or more thereof. Note that the electrolyte in the present embodiment refers to liquid electrolyte solution containing such compound/solvent. The size of the electrical energy storage cell 1 differ depending on its applications. In the present embodiment, the longitudinal dimension of the flat roll electrode is approximately 150 millimeters; the transverse dimension thereof, approximately 100 mm; and the depth-wise dimension thereof, approximately 10 mm. The capacitance of the electric double-layer capacitor is approximately 2000 F.

FIG. 2A and FIG. 2B show constructions of the electrolyte reservoir, which has been omitted in FIG. 1; FIG. 2A is a top plan view; and FIG. 2B, a cross-sectional view taking along line A-A'. The flat roll electrode 17 is configured by winding into a flat roll configuration a cathode (positive electrode), an anode (negative electrode) and a separator around two roll cores 21; a current collector foil cutaway portion electrolyte reservoir 22 is provided in the center portion. In most cases, the roll cores 21 are used only at the time of forming into the flat roll configuration, and upon completion of the cell, the core is drawn out from the cell; however, when the cores are to be left as they are, a metal pipe such as hollow tubular aluminum, or resin pipe, is employed. Further, the roll cores 21 can be replaced with electrolyte reservoirs. In this way, when the roll core(s) is replaced with the electrolyte reservoir(s), the reservoir in the core portion is called core electrolyte reservoir. The core electrolyte reservoir is constituted by porous materials that may be ones to be used for a separator, such as cellulose or a porous resin, or may be a porous metal such as aluminum foam, nickel foam, or nickel mesh. The core electrolyte reservoir is configured so as to make a contact with the separator that is exposed to the cathode current collector foil cutaway portion 2 and the anode current collector foil cutaway portion 3. In subsequent description of the present embodiment, the roll core portion is assumed to include the core electrolyte reservoir 21.

Figure 3:
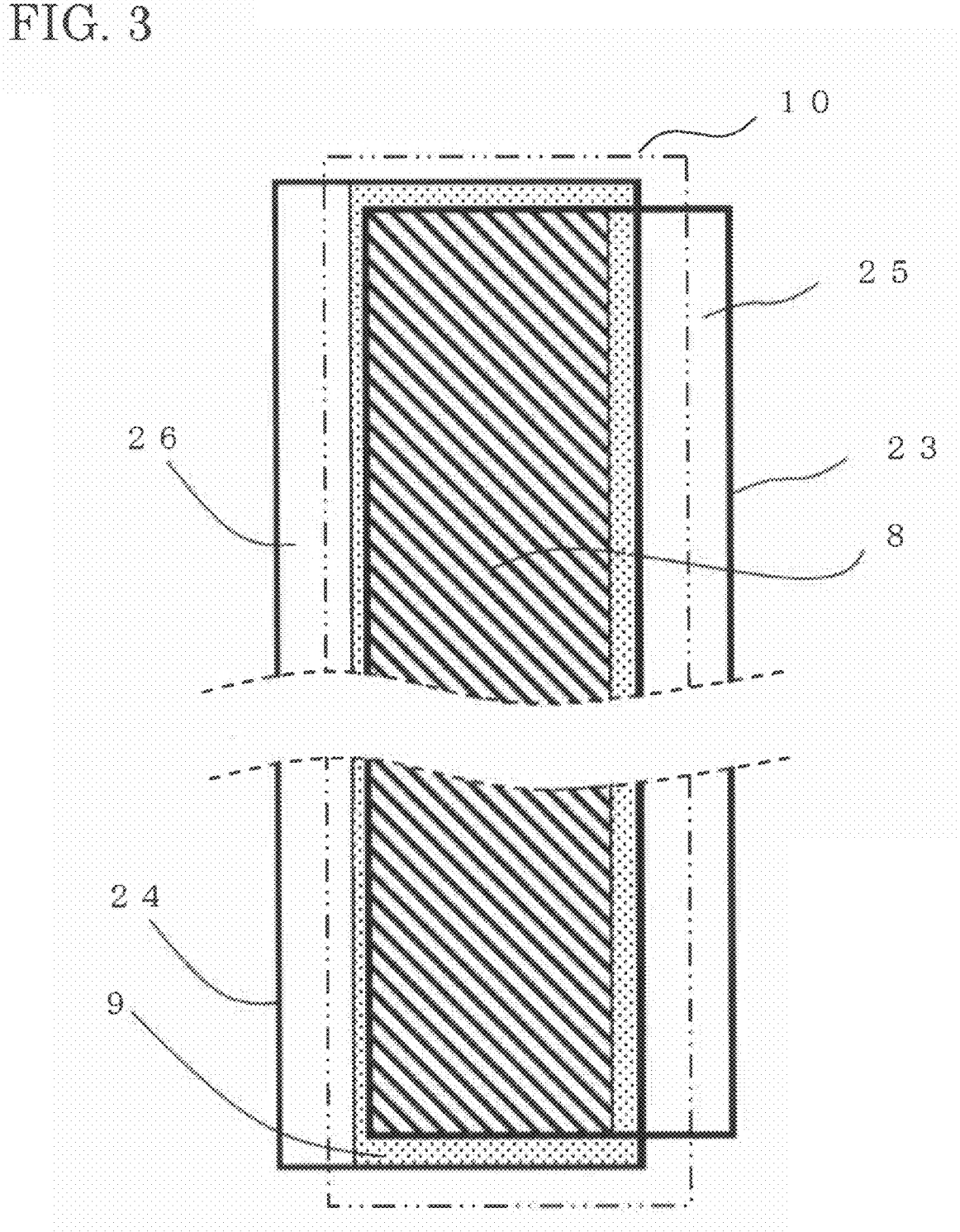
FIG. 3 is a schematic view showing sizes and placement of strips of cathode (positive electrode), anode (negative electrode) and separator according to Embodiment 1 of the present invention.

FIG. 3 is schematic diagram illustrating the arrangement and relative sizes of strips of the cathode (positive electrode) 23, anode (negative electrode) 24, and the separator 10. In the present embodiment, the lengths of such electrodes and separator are approximately 8 meters. The cathode 23 is formed with the cathode layer 8, in a state where a cathode current collector foil (hereinafter also called cathode foil), designated by reference numeral 25, leaves a marginal portion (uncovered portion) at its right edge from the end of the layer 8. The anode 24 is formed with the anode layer 9, in a state where an anode current collector foil (hereinafter also called anode foil), designated by reference numeral 26, leaves a marginal portion (uncovered portion) at its left edge from the end of the layer 9. And the anode 24, the separator 10, and the cathode 23 are laminated in the order. At this time, the three elements are laminated with the right side marginal portion (uncovered portion) of the cathode current collector foil 25 being shifted from the left side marginal portion (uncovered portion) of the anode current collector foil 26 so that both of such marginal portions (uncovered portions) remain exposed. The separator 10 is made larger in both width and length than the cathode layer 8 and the anode layer 9. Moreover, the anode layer is made slightly larger than the cathode layer. The reason for this configuration is to provide protection against unusual corrosion, and to prevent occurrence of degradation, in the cathode layer that is not located opposite the anode layer. Without limiting to the electric double-layer capacitors, the same configuration may be used for the lithium-ion battery cells or lithium-ion capacitors as well.

Figure 4:
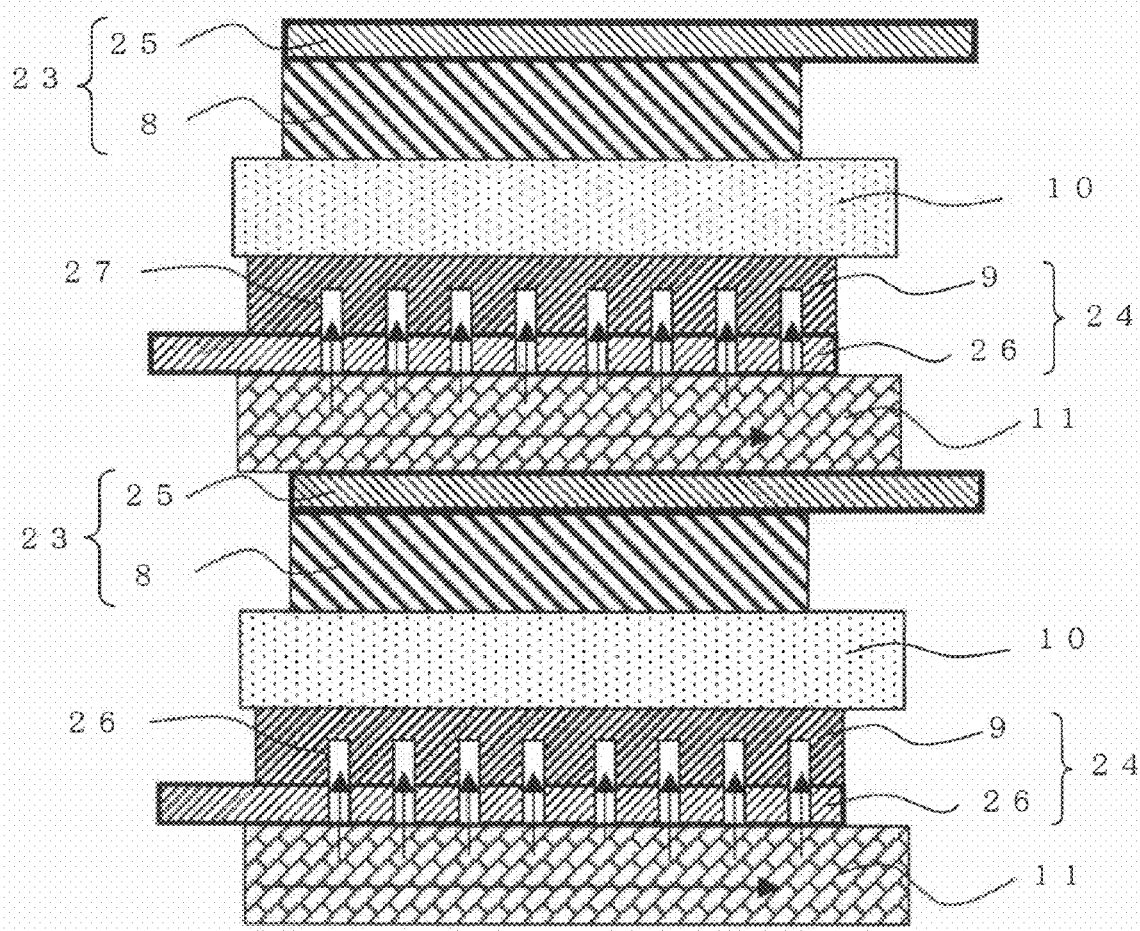
FIG. 4 is a traverse sectional illustration taken in the plane indicated in FIG. 3, of the electrical energy storage cell according to Embodiment 1 of the present invention.

FIG. 4 is a schematic diagram of part of the electrical energy storage cell. A first surface of the cathode current collector foil 25 is formed with the cathode layer 8; a second surface thereof is formed with the inter-foil electrolyte reservoir 11. Likewise, a first surface of the anode foil 26 is formed with the anode layer 9; a second surface thereof is formed with the electrolyte reservoir 11. The anode foil 26 is provided with holes 27.

In FIG. 4, solid arrows each indicate the flow of the electrolyte during charging. The solid arrows indicate the flow of the electrolyte that is directly delivered from the electrolyte reservoir 11, via the holes 27 provided in the anode foil 26, to the anode layer 9, in situations where the cathode layer 8 and anode layer 9 expand during charging and then the electrolyte migrates from the separator 10 to the cathode layer 8 and anode layer 9. Preferably, the holes 27 reach up to the anode layer 9, thus having the advantage of rapidly permeating the electrolyte. The electrolyte that has permeated into the anode layer 9 is delivered, via the separator 10, to as far as the cathode layer 8, thereby readily overcoming the deficiency of the electrolyte resulted from charging. Here, broken lines in FIG. 4 shows the migration of the electrolyte in the inside of the electrolyte reservoir 11 in situations where the electrolyte is delivered from a different electrolyte reservoir, for instance, the core electrolyte reservoir, to the electrolyte reservoir 11.

During discharging, contrary to charging, the electrolyte flows back to and is recovered in the electrolyte reservoir 11. The amount of the electrolyte unrecoverable in the electrolyte reservoir 11 is to be absorbed in the different electrolyte reservoir 11. If the current collector foil cutaway portion electrolyte reservoir is provided in the cutaway portion, then surplus electrolyte is recovered more rapidly.

Figure 5:
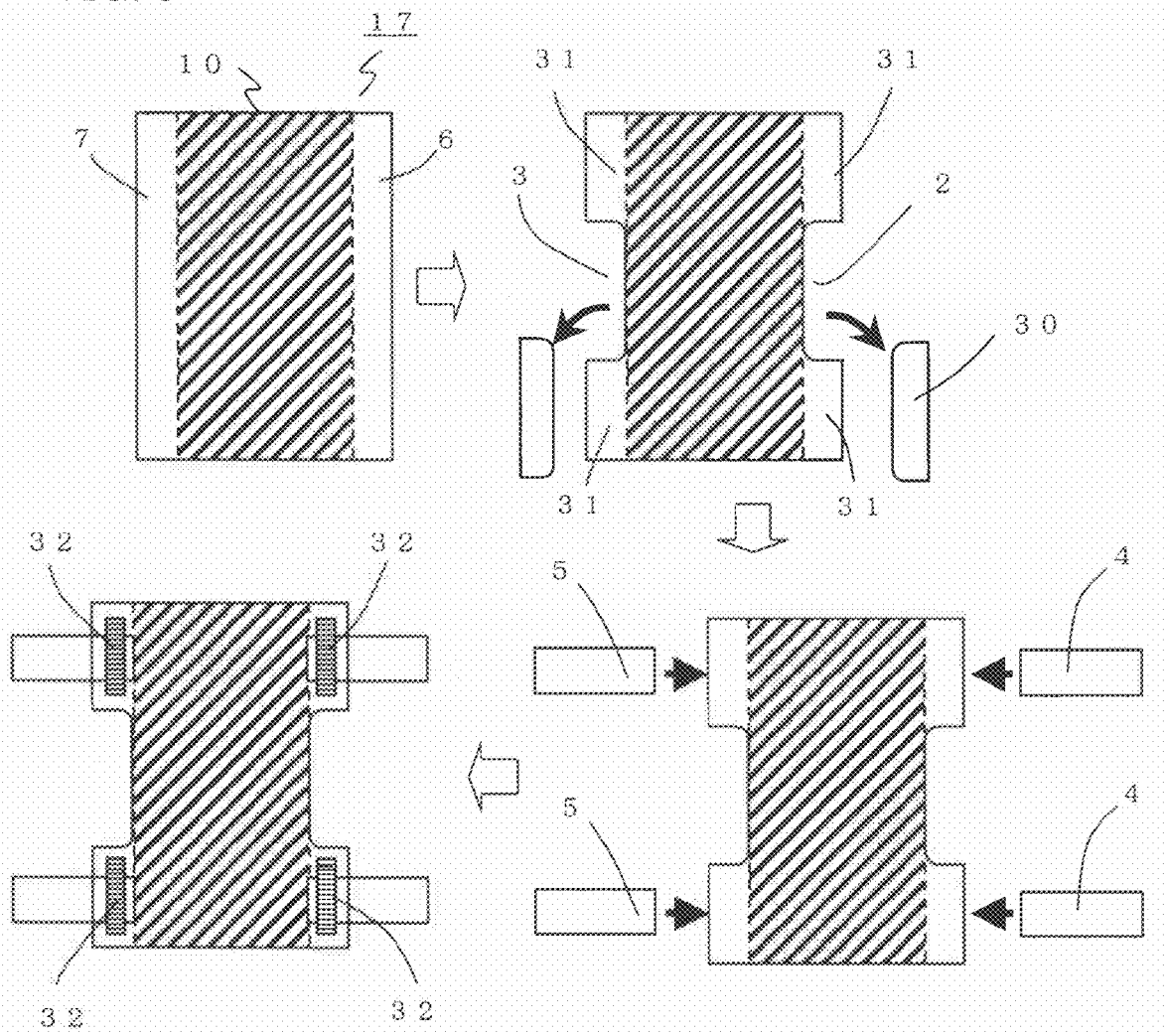
FIG. 5 shows schematic illustrations each depicting the manufacture steps of a flat roll electrode according to Embodiment 1 of the present invention.

FIG. 5 shows schematic illustrations each depicting the fabrication steps of the flat roll electrode 17. In the steps, the edge portions 6 and 7 of the current collector foil that is adjacent the core of the electrode 17 formed with a roll winding machine are cut away using a press machine, and the cathode cutaway portion 2 and anode cutaway portion 3 are created by removing a cutoff piece 30. An assemble is performed so that the separator 10 is exposed at cut surfaces of such cutaway portions. The cutoff piece 30 is recovered as a metallic material (aluminum or copper) for recycled use. Remaining parts of the edge portions 6, 7 form four non-cutaway (non-recessed) portions 31. Next, the cathode terminal 4 and anode terminal 5 are each axially inserted between laminated current collector foils at the four non-cutaway (non-recessed) portions 31 and then bonded supersonically. At this time, the laminated current collector foils and the electrodes are supersonically bonded together at several times so that electrical connections between all of them are ensured. For that reason, bonding marks remain visible in supersonically bonded portions 32.

In this way, in each non-cutaway (non-recessed) portion, the laminated current collector foils and the electrode terminals are all electrically connected together. Thus, along with reduction of the current collector resistance, heat generated in the internal current collector foils can rapidly be transferred via the electrode terminals to the outside of the electrical energy storage cell, which thus can enhance heat dissipation performance of the cell.

Figure 6:
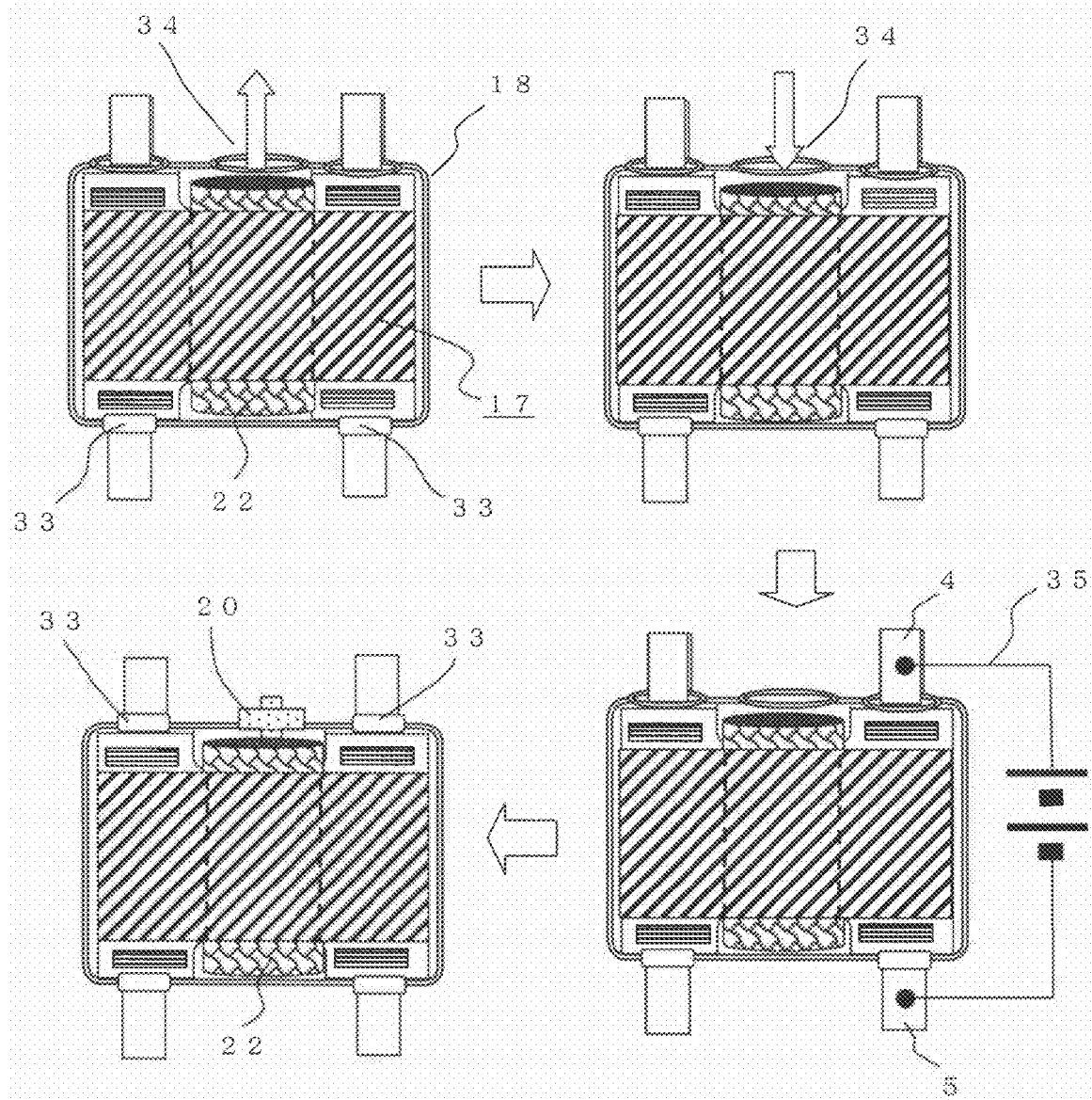
FIG. 6 shows schematic illustrations depicting the fabrication steps of the electrical energy storage cell according to Embodiment 1 of the present invention.

FIG. 6 shows schematic illustrations depicting the fabrication steps of the electrical energy storage cell 1, in which the electrolyte reservoir 22 of the current collector foil cutaway portion is inserted into the flat roll electrode 17, and then contained in the sealed casing 18. In the present embodiment, the sealed casing 18 is configured with an aluminum-laminated film, and the portions other than those for drawing out the current terminals and for an opening 33 for fitting the gas discharge valve 20 are preliminarily sealed to form into a sack structure. The lower side current terminal is heat-sealed into a heat seal portion 33, thereby avoiding the electrolyte from leaking out from the cell. Polyethylene or polypropylene is used as a heat seal material.

After drawing a vacuum on the inside of the sealed casing 18 from the opening 33 and removing moisture or the like contained in the electrode 17, the electrolyte is infused from the opening 33 into the inside of the sealed casing 18. In the case of the electric double-layer capacitor, voltages higher than the operating voltage is applied across the cathode terminal 4 and anode terminal 5 using an auxiliary charging circuit 35, whereby more water or the like is removed. Thereafter, the gas discharge valve 20 is attached with the attached place being sealed and then two upper current terminals are sealed to complete the storage cell.

The electrolyte migration in thus configured flat roll electrical energy storage cell will be described below referring to FIGS. 1 through 3 and 7.

Figure 7A:
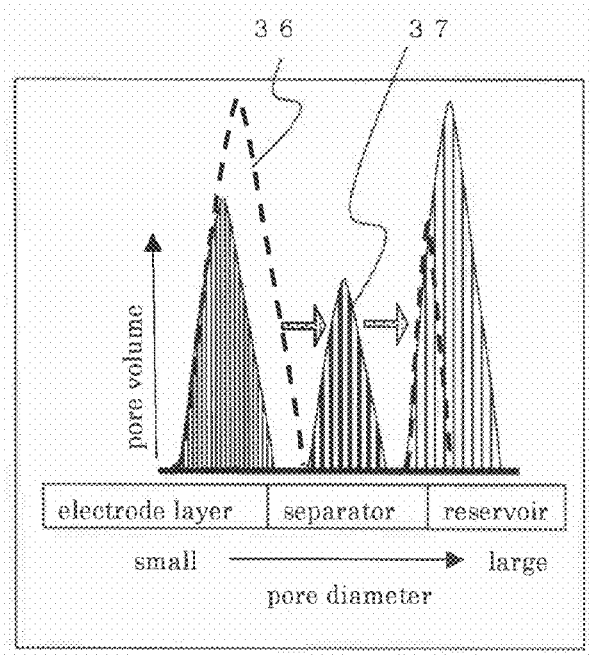
FIG. 7 shows illustrations schematically showing pore distribution of an layer, a separator and electrolyte reservoir according to Embodiment 1 of the present invention.
Figure 7B:
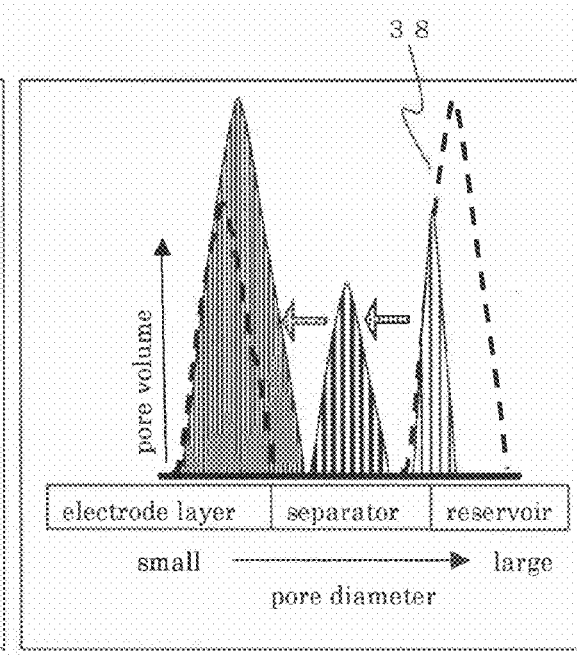

FIG. 7 shows illustrations schematically showing pore distribution of an layer, a separator and electrolyte reservoir. In FIG. 7, the horizontal axis shows pore diameters; the vertical axis shows qualitatively pore volumes; the curves each show electrode layer pore volume distribution 36, separator pore volume distribution 37, and electrolyte reservoir pore volume distribution 38, of the respective electrode layers. In addition, illustrations shown by the hatch lines (shaded) indicate volume distributions of pores filled with the electrolyte. FIG. 7A and FIG. 7B show the state of discharge and charge respectively. In any case of the electric double-layer capacitors, the lithium-ion battery cells and the lithium-ion capacitors, because, during charging, ions enter carbon and active materials of the electrode layer together with solvent, the layer expands to cause the deficiency of the electrolyte. The deficiency in amount is compensated using the electrolyte contained in the separator. Thus, the amount of the electrolyte in the separator becomes deficient during charging. Conversely, because, during discharging, ions leave from the carbon and active materials of the electrode layer together with the solvent, the electrode layer contracts to cause the overflow of the electrolyte. The overflowed amount of the electrolyte is delivered back to the separator. As a result, the electrolyte in the separator overflows during discharging. When charging/discharging cycle is short and yet the large amount of current flows, the transfer of the electrolyte from/to the separator is not carried out in time. When the electrolyte reservoir is not provided, the electrolyte is delivered from the separator to a redundant portion of the casing. And gravity causes such electrolyte to stay in the lower portion of the casing; thus, the electrolyte cannot be recovered to the separator. In particular, with the rolled type one, repeating the rapid charging and discharging causes a temperature distribution, a larger current distribution or the like, and thus, the amount of electrolyte becomes deficient or excessive depending on portions of the separator.

At this situation, when the separator is configured to extend to the outside in the axial direction like the conventional flat roll electrical energy storage cell, all the separators wound into a roll make contacts with each other at the outside portion thereof in the axial direction, thus resulting in the migration from the separator whose electrolyte has overflowed, to the separator having the deficiency of the electrolyte. In contrast, for the configuration in which the separator will not extend to the outside in the axial direction, it becomes difficult to axially interchange the electrolyte, inside the cell wound via the separator into a roll.

In contrast, since, in the present embodiment, the separator is provided until reaching the current collector foil cutaway portion, via the electrolyte reservoir in the current collector foil cutaway portion, the electrolyte can along the axis be interchanged inside the rolled cell. The average pore diameter of the electrolyte reservoir in the current collector foil cutaway portion is preferably larger than that of the separator, thereby producing the difference in pore attraction, to supply the electrolyte to the separator on a priority basis. Consequently, as long as the electrolyte remains in the electrolyte reservoir, the electrolyte that is impregnated in the separator is retained. Furthermore, even when the electrolyte overflows from the separator, the overflowed electrolyte is caught by and absorbed into the electrolyte reservoir, with no need to worry about the electrolyte leaking out toward a lower place of the casing.

The present embodiment uses, as a material for the separator, separator paper TF40 for the electric double-layer capacitor, mfd. by Nippon Kodoshi Corporation (NKK), and uses, as a material for the electrolyte reservoir of the current collector foil cutaway portion, porous membrane of polypropylene with a thickness of 0.3 millimeters (polypropylene nonwoven fabric (MPF45AC, mfd. by NKK)), with the separator paper and the membrane being wound into a roll. TF40, which is solvent-spun regenerated cellulose fiber, has an average pore diameter of 0.3 micro-meters, and a porosity of 73 volume percent; MPF45AC, which is polypropylene fiber, has an average pore diameter of 4 micro-meters, and a porosity of 75 volume percent. In this way, since the average pore diameters differ by 10 times or more between the separator and the electrolyte reservoir of the current collector foil cutaway portion, the electrolyte is occupied, on a priority basis, by the separator having a large pore attraction. Other than such materials, cellulose, polyethylene, polypropylene, glass fiber paper, or the like can be used as materials for the separator and electrolyte reservoir. Materials for the separator or the electrolyte reservoir of the current collector foil cutaway portion can freely be chosen according to their applications because those having a variety of the average pore diameter and thickness are commercially available.

Figure 2:
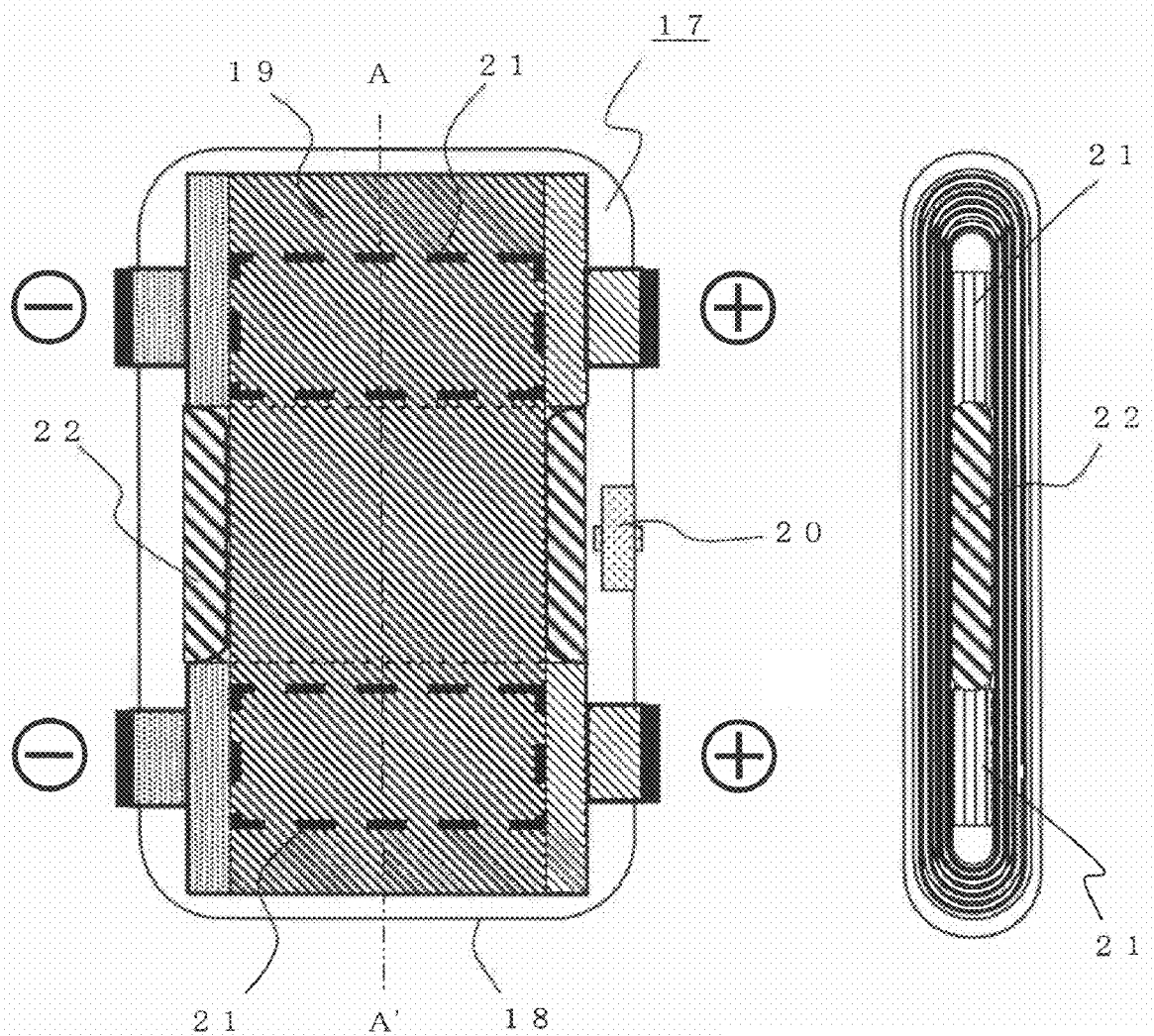
FIG. 2 is a schematic plan view, and a cross-sectional view taken along line A-A', of the electrical energy storage cell according to Embodiment 1 of the present invention.

Next, when, as is shown in FIG. 2, the core electrolyte reservoir is used as the roll core, the storage volume of the electrolyte increases; thus, the reserve function of the electrolyte reservoir in the current collector foil cutaway portion—i.e., a function to retain the electrolyte by supplying along the axis the electrolyte to the separator when the electrolyte in the separator is deficient, and by absorbing the overflowed electrolyte when the electrolyte overflows—is improved.

Here, it is preferable that the average pore diameter of the core electrolyte reservoir be larger than that of the cutaway portion electrolyte reservoir. When the electrolyte in the cutaway portion electrolyte reservoir is deficient, some amount of electrolyte is delivered from the core electrolyte reservoir; when the electrolyte overflows, overflowed electrolyte mitigates to be retained in the core electrolyte reservoir.

Furthermore, as is shown in FIG. 7, it is preferable that the average pore diameter of the inter-current-collector-foil electrolyte reservoir be larger than that of the separator, whereby the flow speed of the electrolyte in the lateral direction can significantly be increased; the electrolyte is also delivered, via the holes provided in the anode current collector foil, to the separator, and the electrolyte overflowed from the separator can be absorbed by the inter-foil electrolyte reservoir. Here, in the present embodiment, although the holes are formed in the anode foil with respect to the electrolyte reservoir, the holes may be formed in the cathode current collector foil, or in both of the current collector foils.

With this arrangement, by making the pore diameter of the separator smaller, the electrolyte can rapidly be interchanged, via the inter-foil electrolyte reservoir, between the separator and the cutaway portion electrolyte reservoir, which can enhances the reserve performance of the electrolyte.

Furthermore, in electrical energy storage cells that need uniform lithium-ion distribution in cell surfaces like lithium-ion battery cells or lithium-ion capacitors, uniform lithium-ion distribution in cell surfaces can be achieved via the inter-foil electrolyte reservoir, which improves lifespan characteristic and carries out the deep charge and discharge cycles.

Furthermore, like the present embodiment, provision of the peripheral roll electrolyte reservoir can avoid the electrolyte from overflowing to the outside of the sealed casing. Preferably, the average pore diameter of the peripheral roll electrolyte reservoir is larger than that of the separator and that of the cutaway portion electrolyte reservoir.

In general, an electric double-layer capacitor, which is fitted with the gas discharge valve, is configured so that in the case of high voltage or high temperature, when gas is generated from the internal of the cell and then the pressure inside the casing increases, the discharge valve opens to release the interior gas, thereby avoiding a burst of the casing. In conventional roll electric double-layer capacitors, the worry has been that there exists the liquid electrolyte inside the casing, and the electrolyte bursts from the gas discharge valve together with gasses, thereby resulting in shorting the peripheral electrical circuits. For this reason, the orientation of the electric double-layer capacitor is determined so that the gas discharge valve is located upwardly; thus, there has been no freedom to dispose a capacitor cell or a capacitor module (a multiple capacitor assembly). In the present embodiment, however, since the liquid electrolyte that has not be contained in the electrode or separator is all absorbed and contained in the electrolyte reservoir, downward placement of the gas discharge valve creates no problem; thus, advantageously, the freedom of arranging the electric double-layer capacitor will increase.

Furthermore, in the present embodiment, an ideal relationship of the average pore diameter between the separator and four types of electrolyte reservoirs, that is, the electrolyte reservoir in the current collector foil cutaway portion, the inter-foil electrolyte reservoir, the core electrolyte reservoir, and the peripheral roll electrolyte reservoir, is as follows:

$$A<B<C<D<E$$

where
A=separator,
B=inter-current-collector-foil electrolyte reservoir,
C=electrolyte reservoir in current collector foil cutaway portion,
D=core electrolyte reservoir, and
E=peripheral roll electrolyte reservoir.

It is to be noted that as long as the average pore diameter of the separator is maintained at a minimum, a malfunction is unlikely to occur; thus, the electrolyte can be transferred in any one of these electrolyte reservoirs.

Note that the electrolyte reservoir is effective only by using one of the four types of electrolyte reservoirs that have been described in the present embodiment. The provision of a plurality of types of electrolyte reservoirs extends the freedom of the arrangement of the gas discharge valve, as well as improving the reserve function. Here, when the inter-foil electrolyte reservoir is not employed, the holes formed in the anode foil or the cathode foil, are not required.

Next, heat transfer and the current collector resistance will be described below. During charging, other than heat generation resulting from iR loss, there is heat generation occurring when ions enter carbon such as active carbon or graphite. This heat is conducted to the current collector foil, and withdrawn outside the cell, through the cathode and anode terminals directly connected with the foil. Since there is provided the terminal at four places and the layers of all the rolled current collector foils are directly connected with either terminal of the cathode or anode, the heat is rapidly released. Because the layers of all the rolled current collector foils are directly connected with either terminal of the cathode or anode, and what is more, currents for both of the cathode and anode are each collected from two places, the current collector resistance can be maintained lower than that of the conventional one.

Embodiment 2

Figure 8A:
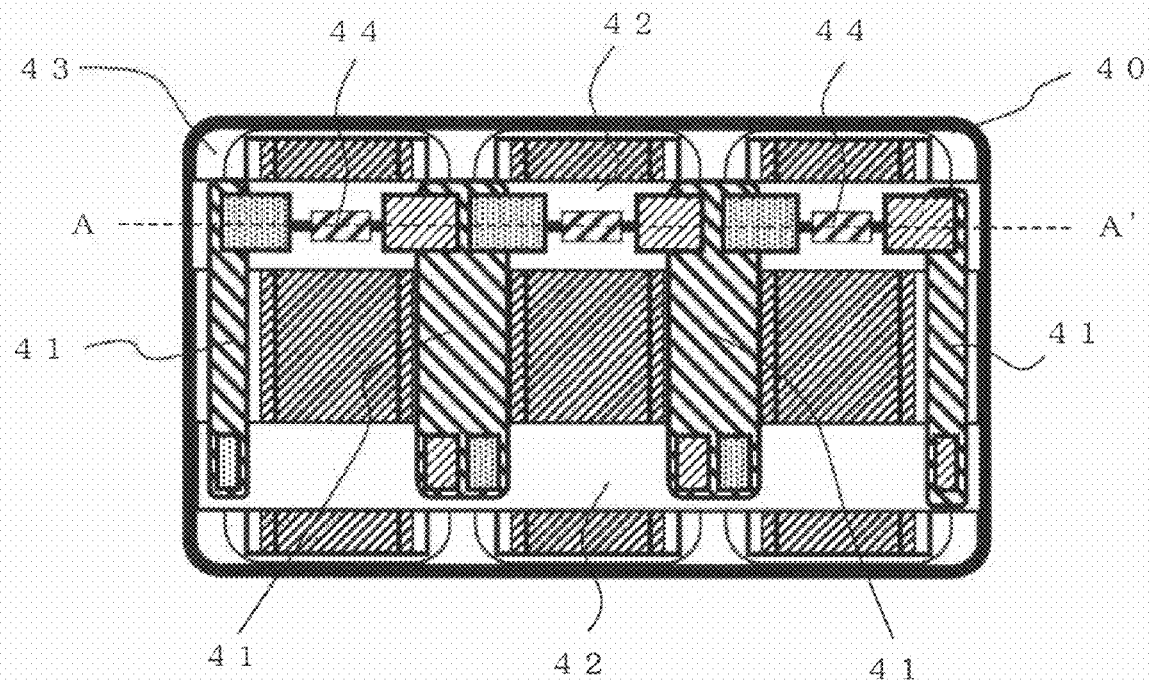
FIG. 8 shows a schematic internal plan view, and a cross-sectional view, of the electrical energy storage module according to Embodiment 2 of the present invention.
Figure 8B:
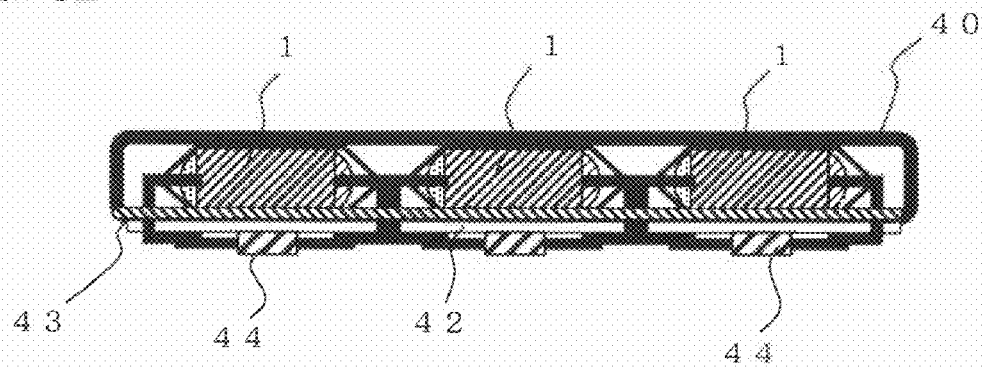

Next, an electrical energy storage module using the electrical energy storage cell according to the present invention will be described referring to FIGS. 8 and 9. FIG. 8A and FIG. 8B show a schematic internal plan view and a cross-sectional view, respectively, illustrating a three-cell storage module using the electrical energy storage cell of a flat roll configuration, according to Embodiment 2. The electrical energy storage cell referred to in the present embodiment is one that has been described in Embodiment 1. Three electrical energy storage cells 1 are arranged inside a casing for containing the module (hereinafter called a module casing), designated by reference numeral 40, of aluminum formed by a drawing process. In one of the electrical energy storage cells 1 and its adjacent cell, two of the cathode terminals 4 of the former and two of the anode terminals 5 of the latter are connected together using heat dissipation plates 41 made of a copper plate. In the same storage cell 1, a protection circuit 44, such as e.g., a zener diode, is provided across the cathode and anode terminals thereof. Moreover, insulator plates 42 made of a phenol resin plate are inserted between the flat roll electrode of the electrical energy storage cell 1, for electrical insulation purpose and the cathode terminal, and between the electrode thereof and the anode terminal. A lid of the casing containing the module (hereinafter called a casing lid), designated at 43, which is made of an aluminum plate, yields an advantage of facilitating heat dissipation. The module casing, together with the casing lid 43, contains three electrical energy storage cells 1 in such a manner that the lid 43 snugly fits the module casing 40 of aluminum formed by the drawing process. On this occasion, to avoid the casing lid 43 from touching the cathode and anode terminals, openings/holes are provided with the lid 43 at places corresponding to the terminal positions. The cathode and anode terminals, after passing through the holes/opening provided in the casing lid 43, further pass through holes provided in the insulator plate 42, and is electrically connected to a heat dissipation plate 41 by supersonic bonding or the like. It is preferable that the edges of the holes/openings provided in the casing lid 43 be fitted with the electrically insulated film or rubber. This arrangement will protect the cathode and anode terminals, even when deformed owing to force exerted from the outside, from directly contacting the casing lid 43, thus avoiding the short-circuit between the electrodes and the lid 43.

Figure 9A:
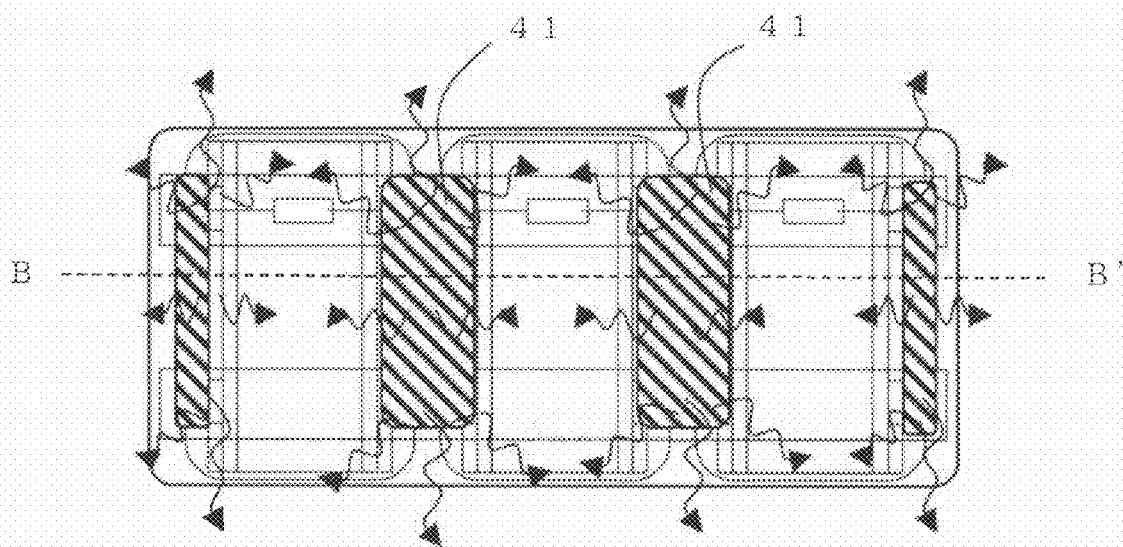
FIG. 9 shows schematic plan and sectional illustrations each depicting heat dissipation phenomenon in electrical energy storage module according to Embodiment 2 of the present invention.
Figure 9B:
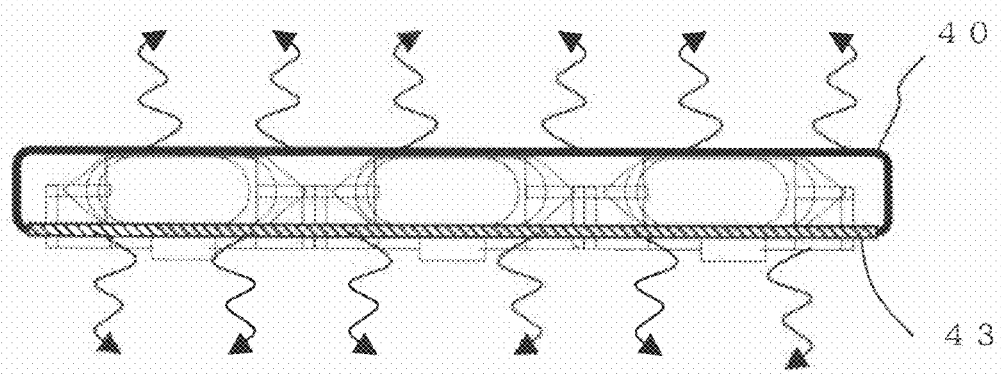

The electrical energy storage module configured in this way has a high heat dissipation characteristic. FIG. 9A and FIG. 9B show a schematic plan illustration and a sectional illustration (taken along lines B-B' in the plan illustration), respectively, each depicting heat dissipation phenomenon in the electrical energy storage cell configured with three cells, according to the present embodiment. Zigzag arrows in the illustrations show the heat dissipation to the outside of the storage module. By connecting total four terminals to the heat dissipation plate 41, heat generated in the internal of the cell is conducted, through four terminals, to the plate 41, thus permitting effective heat dissipation to the outside.

Further, the heat dissipation plate 41 functions to make a direct connection between the neighboring cells, ensuring a low resistance electrical contact of connecting the cells in series in the module.

Further, by sandwiching each cell between the module casing 40 and the module casing lid 43, heat dissipated from the surfaces of the cells can effectively be released to the outside.

Referring to FIG. 8, the protection circuit 44 is to provide a bypass circuit for the charging current, for the sake of safety in situations where the cells are fully charged. In the present embodiment, after the cathode terminal 4 and anode terminal 5 are placed at the closest distance from one another on the insulation plate 42, those terminals are connected to the protection circuit 44. With this arrangement, the connection distance in the protection circuit is maintained at a minimum, whereby heat generation resulting from the large current flowing in the protection circuit can be maintained at a minimum. In addition, because of the connection distance being short, the large amount of current can be flowed through the protection circuit.

Embodiment 3

Figure 10A:
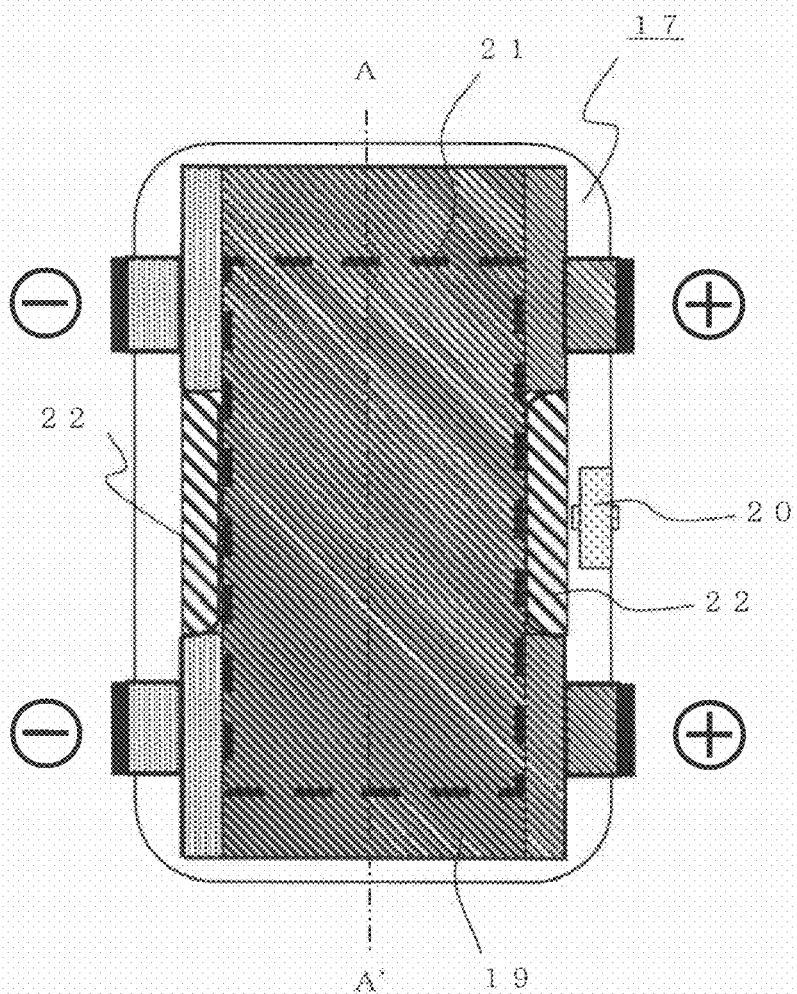
FIG. 10 shows a schematic plan view, and a cross-sectional view taken along line A-A', of an electrical energy storage cell according to Embodiment 3 of the present invention.
Figure 10B:
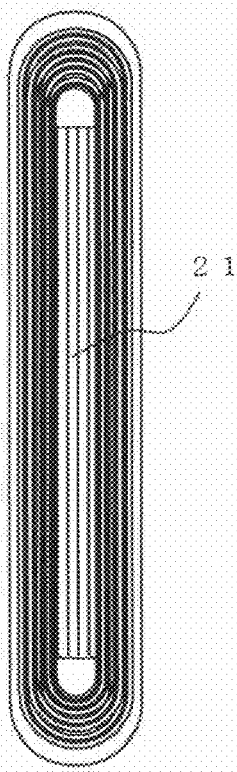

FIG. 10 is a plan view illustrating the flat roll electrical energy storage cell according to Embodiment 3 of the present invention. A difference between the present embodiment and Embodiment 1 is that the electrolyte reservoir 22 of the current collector foil cutaway portion is not made to pass through the core portion, with the configuration remaining the same except for this difference. In the present embodiment, although the electrolyte reservoir 22 of the current collector foil cutaway portion is not inserted into the core portion, the separator, which is exposed from the current collector foil at the cathode foil cutaway portion 2 and anode foil cutaway portion 3, make a contact with the electrolyte reservoir 22 of the current collector foil cutaway portion, thus enabling sufficient transfer of the electrolyte.

Further, because the core electrolyte reservoir 21 is disposed, and the electrolyte released from the separator to the electrolyte reservoir 22 is absorbed by the core electrolyte reservoir 21 as well, more electrolyte can be retained in the electrical energy storage cell. Thus, when there is a deficient amount of electrolyte in the separator, supplementary electrolyte can be supplied, in an inverse direction, from the core electrolyte reservoir 21 via the electrolyte reservoir 22 to the separator.

Such a configuration also maintains the contact of the electrolyte reservoir 22 with the separator, thus ensuring the reserve function. Another contact of the separator with the peripheral roll electrolyte reservoir 19 performs a stronger reserve function of the electrolyte.

Embodiment 4

Figure 11:
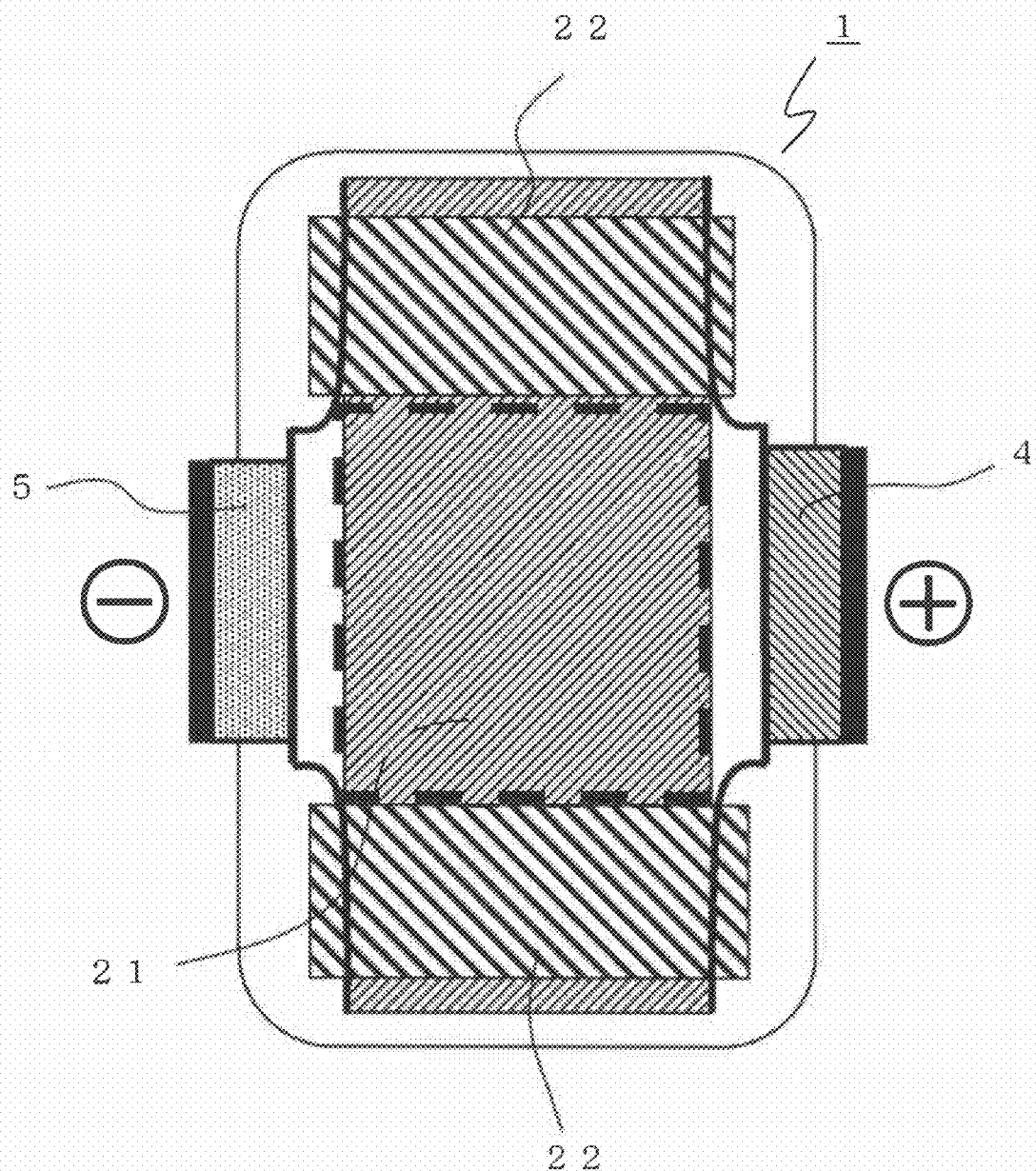
FIG. 11 is a schematic plan view of an electrical energy storage cell according to Embodiment 4 of the present invention.

FIG. 11 is a schematic plan view of an electrical energy storage cell according to Embodiment 4 of the present invention. A difference between the present embodiment and Embodiment 1 is that not a total of four terminals but the total of two terminals have been provided, and that the electrolyte reservoir 22 has been provided not at one place but at two places, with configuration other than this difference being the same.

When the electrical energy storage cell has an small in cell area, there is no need of necessarily providing each of the cathode and anode terminals at two places, and each terminal may be provided at a single place, in which situation it is preferable that each terminal be disposed in the midsection of the cell. When a pair of the terminals is provided in the midsection thereof, the pair is disposed at each end of the cell in the present embodiment because the electrolyte reservoir 22 are not allowed to be disposed in the midsection thereof. Moreover, the core electrolyte reservoir 21 is additionally provided for the purpose of strengthening the electrolyte reserve function. The core electrolyte reservoir 21, which is not necessarily needed, has an advantage of further strengthening the electrolyte reserve function in concert with the electrolyte reservoir 22.

In comparison with that of Embodiment 1, although the flat roll electrical energy storage cell, thus configured, has a disadvantage in terms of current collector resistance and heat dissipation on account of a less quantity of terminal, increasing the area of the terminal can reduce the current collector resistance and enhance the heat dissipation characteristic. In addition, an advantage is that the number of electrolyte reservoirs 22 increasing to two strengthens the reserve function. It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:

1. An electrical energy storage cell, comprising:
   a flat roll electrode that includes a strip of positive electrode having a positive current collector foil and a positive electrode layer formed thereon, a strip of negative electrode having an negative current collector foil and a negative electrode layer formed thereon, and a strip of electrically insulated separator, the strip of positive electrode and the strip of negative electrode being wound into a flat roll configuration with the strip of electrically insulated separator sandwiched therebetween;
   a sealed casing that hermetically seals the flat roll electrode impregnated with an electrolyte; and
   a positive terminal and a negative terminal each electrically insulated from the sealed casing, connected to the positive current collector foil and the negative current collector foil, respectively;
   wherein the positive current collector foil and the negative current collector foil oppositely extend away from the separator along a roll core axis, and each of the foils include edge portions having no positive layer or negative layer formed therewith;
   each of the edge portions is configured to include a cutaway portion where part of the edge portions is not existing so that the separator is exposed at the cutaway portion, and a non-cutaway portion constituting portions other than the cutaway portion;
   each of the positive current collector foil and the negative current collector foil is electrically coupled together in a lamination direction at the non-cutaway portions and electrically connected to the positive terminal and the negative terminal, respectively; and
   an electrolyte reservoir that makes a contact with the exposed separator is provided at each of the cutaway portions.

2. The electrical energy storage cell of claim 1, wherein the cutaway portion is provided in the middle of each of the edge portions of the cell, to create a non-cutaway portion on each side of the cutaway portion, and positive terminals or negative terminals are provided on each pair of the non-cutaway portions.

3. The electrical energy storage cell of claim 1, wherein a pore diameter of the electrolyte reservoir is larger than that of the separator.

4. The electrical energy storage cell of claim 1, wherein the electrolyte reservoir is configured so as to pass through a roll core axis portion.

* * * * *